(12) United States Patent
Rollmann et al.

(10) Patent No.: US 8,827,692 B2
(45) Date of Patent: Sep. 9, 2014

(54) OIL BURNER, REGULATING DEVICE AND REGULATING METHOD THEREFOR

(75) Inventors: Juergen Rollmann, Lollar (DE); Detlev Gerling, Marburg (DE); Sadik Cecen, Lohra (DE); Rainer Rausch, Alsfeld (DE); Michael Schuessler, Marburg-Ginseldorf (DE)

(73) Assignee: Robert Bosch GmbH, Stuttgart (DE)

( * ) Notice: Subject to any disclaimer, the term of this patent is extended or adjusted under 35 U.S.C. 154(b) by 83 days.

(21) Appl. No.: 13/504,704

(22) PCT Filed: Oct. 25, 2010

(86) PCT No.: PCT/EP2010/066074
§ 371 (c)(1),
(2), (4) Date: Aug. 21, 2012

(87) PCT Pub. No.: WO2011/051232
PCT Pub. Date: May 5, 2011

(65) Prior Publication Data
US 2012/0308942 A1    Dec. 6, 2012

(30) Foreign Application Priority Data
Oct. 29, 2009  (DE) .......................... 10 2009 051 327

(51) Int. Cl.
*F23L 15/00*    (2006.01)

(52) U.S. Cl.
CPC ............. *F23L 15/00* (2013.01); *F23N 2037/20* (2013.01)
USPC .................. 431/11; 431/36; 431/37; 431/162; 431/354; 431/210; 431/215

(58) Field of Classification Search
USPC ............... 431/11, 36, 37, 161, 162, 207, 208, 431/210, 215, 216, 354
See application file for complete search history.

(56) References Cited

U.S. PATENT DOCUMENTS 3,273,520 A * 9/1966 Hottenstine ................... 110/189
4,516,628 A   5/1985 Ward

FOREIGN PATENT DOCUMENTS

| | | |
|---|---|---|
| CN | 1090387 | 8/1994 |
| DE | 15 26 178 | 5/1972 |
| EP | 1925883 | 5/2008 |

* cited by examiner

Primary Examiner — Alfred Basichas
(74) Attorney, Agent, or Firm — Kenyon & Kenyon LLP

(57) ABSTRACT

A method for regulating a temperature of a combustion medium in a mixing zone of a burner and a method for regulating a burner, in particular an oil burner, a burner performance being modulated. A heating system including a burner, which includes a regulating device, and a regulating device for a burner, in particular an oil burner. The method/system is intended to provide as constant a temperature as possible in the mixing zone during the different operating modes and with changed burner performance. The combustion air flows through a first supply tract in a first operating mode and in adjustable proportions through the first and/or a second supply tract in a second operating mode, and the combustion air is supplied with heat via a heating element, which may be switched on and off, in the first supply tract, and with heat from a combustion zone in the second supply tract.

15 Claims, 1 Drawing Sheet

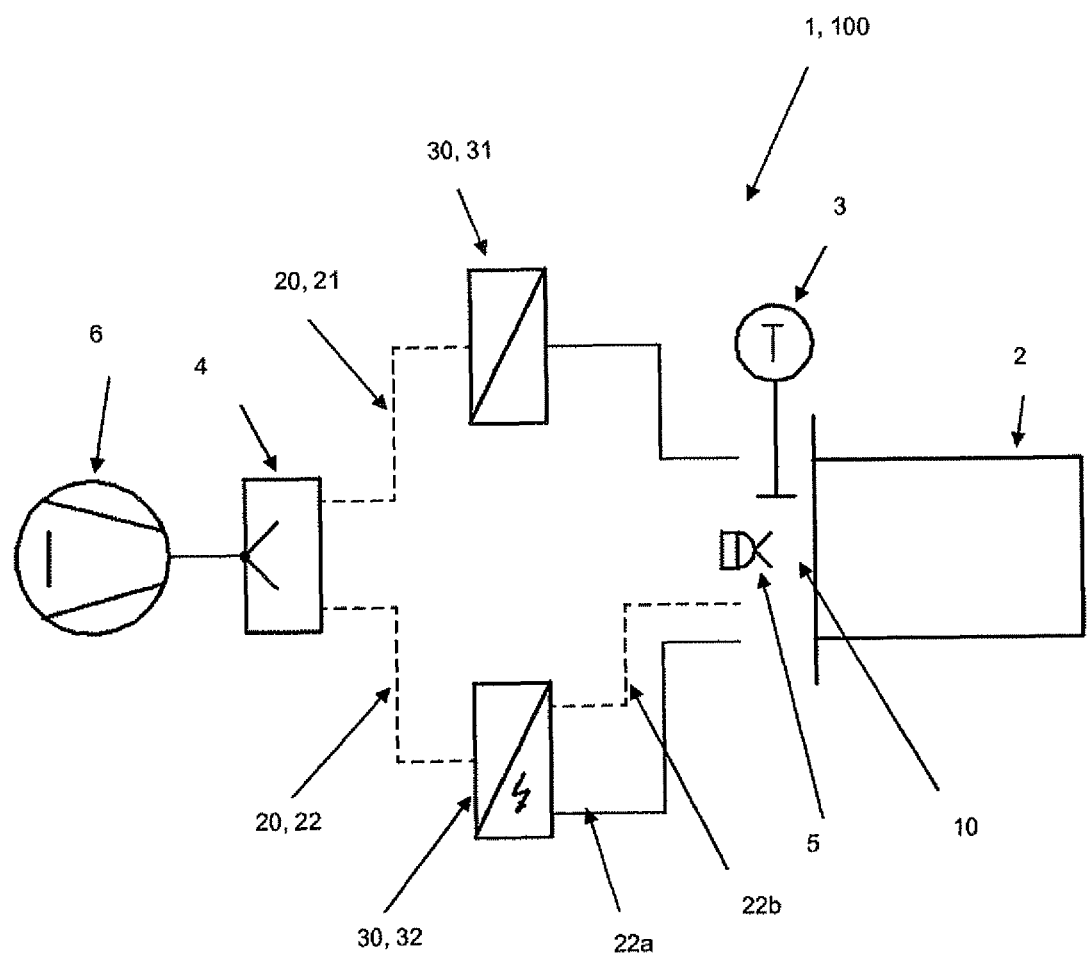

OIL BURNER, REGULATING DEVICE AND REGULATING METHOD THEREFOR

FIELD OF THE INVENTION

The present invention relates to a method for regulating a temperature of a combustion medium in a mixing zone of a burner. The present invention further relates to a method for regulating a burner, in particular an oil burner, the burner output being modulated. The present invention additionally relates to a regulating device for a burner, in particular an oil burner. The present invention further relates to a burner, in particular an oil burner, for generating heat energy with the aid of combustion.

BACKGROUND INFORMATION

Oil burners are believed to be understood from the general related art. They have a combustion air blower integrated into the burner and, in particular in low-output burners, the heating oil is ignited under low load. In systems, in particular large combustion systems which use oils that are more difficult to ignite, such as heavy heating oil, a separate gas-fired pilot burner is used. In general, the liquid fuel needs to be atomized as finely as possible in the combustion chamber to obtain a large surface for the combustion reaction. For emissions reasons, the aim is to achieve a long dwell time and as low a combustion temperature as possible to achieve good total combustion while emitting little nitrogen oxide. The following types of atomization are generally known in oil burners: pressure atomization, rotary atomization and atomization using an atomizing medium. The temperature prevailing in a mixing zone is decisive for the efficiency of an oil burner.

In particular, in the case of combustion systems in buildings it is important to modulate a burner in order to adjust the combustion output to the best possible extent to the instantaneous heat demand of the connected heating circuits. This will result in long operating times, few burner starts, and good efficiency due to effective utilization of the gross calorific value in gas condensing boilers.

SUMMARY OF THE INVENTION

An object of the exemplary embodiments and/or exemplary methods of the present invention is to achieve as constant a temperature as possible in the mixing zone in different operating modes and with changed burner outputs.

This object may be achieved according to the exemplary embodiments and/or exemplary methods of the present invention with the aid of subject matters having the features described herein. Advantageous refinements are derived from the further description herein.

The method according to the present invention for regulating a temperature of a combustion medium in a mixing zone of a burner, including the step of supplying the combustion air to the mixing zone via a supply path for operating a burner, is characterized in that the combustion air flows through a first supply tract in a first operating mode and in adjustable proportions through a first and/or second supply tract in a second operating mode. During this process, the combustion air is supplied with heat via a heating element, which may be switched on and off in the first supply tract, and with heat from a combustion zone in the second supply tract. If the combustion air temperature in the mixing zone deviates from a setpoint temperature, the combustion air proportions and/or the switching state of the heating element is/are changed, thereby making the temperature of the combustion air in the mixing zone adjustable to a setpoint temperature by mixing the combustion air portions.

In one specific embodiment of the method according to the present invention it is provided that the temperature in the mixing zone is detected and compared with predefined values. In a further specific embodiment it is provided that a separate supply tract is opened for a starting mode, through which cooler combustion air is supplied, if a deviation of the temperature has been determined. The starting mode is the operating mode when starting the burner.

The method according to the present invention for regulating a burner, in particular an oil burner, a burner output being modulated, is characterized in that the combustion air is divided into portions for a first and/or second supply tract and/or the switching state of the heating element is adjusted as a function of the degree of modulation. The modulation is performed as a function of the temperature according to the method of the present invention for regulating a temperature of the combustion air in a mixing zone of a burner.

The regulating device according to the present invention for a burner, in particular an oil burner, having at least one supply tract for supplying combustion air for a long-term operation of the burner, the supply tract having a heating system for preheating the combustion medium to be supplied, is characterized in that a separate supply tract for supplying combustion air to start the burner is provided, the at least two supply tracts being coupled via a final control unit which, in the case of deviation of a temperature of the combustion air supplied for operation via the supply tract, opens the supply tract, which is closed during long-term operation, in order to start the burner, causing the combustion media supplied via the two supply tracts to mix.

The long-term operation of the burner occurs in the steady-state operating mode of the burner. The burner is started via the "start" operating mode. During the long-term operation, a heating element in the supply tract may be switched off for the "start" operating mode.

In a further specific embodiment, the regulating device is characterized in that a first supply tract has a heating element, which may be switched on and off, a second supply tract, situated parallel to the first supply tract, including a heat exchanger which is heatable from a combustion zone, and a final control unit for dividing the combustion air of the first and second supply tracts into portions. Using this method, the temperature of the combustion air in the mixing zone may be adjusted to a setpoint temperature by mixing the combustion air portions.

In one further specific embodiment of the present invention, it is provided that the final control unit is coupled on the input side to a feeding unit for supplying the combustion air. In one specific embodiment, the feeding unit includes a blower for feeding the combustion air. In another specific embodiment, the feeding unit includes at least one oil nozzle and optionally an oil pre-heater for feeding in oil.

One exemplary embodiment of the regulating device further provides that the final control unit has final control elements, which may be operated by an actuator, in order to close and/or open the supply tracts branching off on the outlet side.

A further advantageous specific embodiment of the present invention provides that each supply tract has a heating device for pre-heating the combustion medium. At least one heating device is implemented in such a way that it may be switched off. Additionally, a further specific embodiment of the present invention provides that the heating device of the supply tract for starting the burner is switchable so that, during the different operating modes of the burner, the combustion medium is supplied in a heated and/or untreated state.

A further advantageous specific embodiment of the present invention provides that at least one temperature detecting unit is provided in the area of the mixing zone for detecting the temperature in the mixing zone.

Still another specific embodiment of the present invention provides that at least one further final control unit is provided to regulate a pre-heating of at least one combustion air flow.

The burner according to the present invention, in particular an oil burner, for generating heat energy with the aid of combustion, is characterized in that a regulating device according to the present invention is provided. The burner is integrated into a heating system for generating energy by burning an energy carrier with the aid of a heating system for burning the energy carrier.

Using the method according to the present invention, the regulating device according to the present invention, and the burner according to the present invention, the following advantages are realized, in particular:

The present system is intended to ensure that the temperature in the mixing zone is maintained at the same level in all operating modes, even if the burner output changes. Thus, a robust operation including reliable burner starts and a low-emission combustion is accomplished. Due to the fact that there is the option of conducting the combustion air volume flow through two channels, current in the starting mode the air is conducted through one channel and heated by a heating element, which is supplied with. During steady-state operation, the air is conducted through another channel and heated by a tubular heat exchanger. Switching between the channels during the individual operating stages may be regulated as desired, making modulation possible. By modulating to low load during steady-state operation, the volume flow of the combustion air is reduced, the flow speed is reduced, and the dwell time is increased. An increase in temperature is recognized with the aid of the present invention and the appropriate counter measures are subsequently initiated, so that the temperature is brought back to a constant and favorable level for the present operating mode. In one embodiment, this is achieved by opening the first channel, through which cold air flows into the mixing zone via the non-energized heating element, in which mixing zone the cold air mixes with the air coming from the heat exchanger and reaches a constant temperature level. With the aid of this method and/or associated mechanical components it is possible, on the one hand, to maintain the mixing temperature at the same level during modulation and, on the other hand, to maintain the temperature also at a higher/lower level by being able to geometrically adjust the heat exchanger and the electrical output of the heating element. Thus, even biogenic fuels having different ignition temperatures are efficiently combustible.

BRIEF DESCRIPTION OF THE DRAWING

The FIGURE represents an exemplary embodiment of the present invention and schematically shows, in the form of a wiring diagram, a burner of a heating system having a regulating device.

DETAILED DESCRIPTION

The FIGURE schematically shows in the form of a wiring diagram a burner 100 of a heating system having a regulating device 1. Burner 100 includes a fuel rod 2 for burning a combustion medium. Burner 100 is designed here in the form of a modulating oil burner. Accordingly, the combustion medium is oil, which is burned using fuel rod 2. In addition to oil as first combustion medium, air is supplied for a combustion, as well. Via an oil nozzle 5, the oil is supplied to a mixing zone 10, in the area upstream from the oil nozzle and within fuel rod 2. Air and oil are mixed there to obtain an optimal combustion mixture.

The combustion air volume flow is supplied to mixing zone 10 via either the first or the second of two supply tracts 20. For this purpose, a first supply tract 21 conducts the air volume flow to mixing zone 10 for a "steady-state operation" operating mode. A second supply tract 22 conducts the air volume flow for a "start" operating mode. The particular supply tract may be chosen using a final control unit 4, which is connected downstream from a blower 6 for supplying the air volume flow. The air volume flow may be branched out via final control unit 4, which is designed as a switching flap and/or mixing plate.

In the "start" operating mode, the air volume flow is conducted via second supply tract 22 to a heating device 30 designed in second supply tract 22 in the form of a heating element 32, which is supplied with current. Heating element 32 is switchable. In the "start" operating mode, the supplied air volume flow is heated in connected heating element 32. From there, the heated air volume flow is transferred to mixing zone 10 via hot air supply tract 22a.

In the "steady-state" operating mode, the supplied air volume flow is conducted through final control unit 4 to first supply tract 21 via blower 6. The air volume flow thus conducted reaches and passes via a first supply tract 21 through a heating device 30, which is designed in the form of a tubular heat exchanger 31, where the air volume flow is heated. Switching between supply tracts 20 during the individual operation stages occurs through a servomotor having an air flap.

Burner 100 is designed for a maximum load operation. By modulating to low load during steady-state operation the volume flow of the combustion air is reduced, resulting in a reduced flow speed of the air volume flow and, accordingly, in an increased dwell time. This causes the air volume flow to have an increased temperature on reaching mixing zone 10. The regulating device is provided to prevent this from happening. The regulating device includes, among other things, a temperature detecting unit 3, which detects the temperatures prevailing in the area of mixing zone 10, and is designed in the form of a temperature sensor. If the detected temperature exceeds a setpoint value, the servomotor opens a second supply tract 22 which is provided for the "start" operating mode. Heating element 32 is not connected or switched on for the "start" operating mode, so that, without being heated by heating element 32, the air volume flow flowing through second supply tract 22 reaches, via a cold air supply tract 22b, mixing zone 10, where it mixes with the air from heating device 30 (or heat exchanger 31). By appropriately regulating final control unit 4 via regulating device 1, a constant temperature level is implemented in mixing zone 10. The invention allows for the temperature in the mixing zone to be maintained at the same level during modulation. Maintaining a constant mixing temperature, even at any desired temperature level, such as a higher or lower level, is possible using an appropriate design. For this purpose, heat exchanger 31 and an electrical output of heating element 32 may have to be adapted accordingly. In this way, the invention may be employed for combustion of biogenic fuels having different ignition temperatures.

What is claimed is:

1. A method for regulating a temperature of combustion air in a mixing zone of a burner, the method comprising:

supplying the combustion air for operating a burner to the mixing zone via a supply path, wherein the combustion air flows through a first supply tract in a first operating mode and in adjustable portions through at least one of the first supply tract and a second supply tract in a second operating mode;

supplying the combustion air with heat in the first supply tract by a heating element, which is switchable on and off; and supplying the combustion air with heat from a combustion zone in the second supply tract.

2. The method of claim 1, wherein in a deviation of the temperature of the combustion air in the mixing zone from a setpoint temperature, the setting of at least one of the combustion air portions and the switching state of the heating element is changed, allowing the combustion air temperature in the mixing zone to be adjustable to a setpoint temperature by mixing the combustion air portions.

3. The method of claim 1, wherein the temperature in the mixing zone is detected and compared to predefined values.

4. The method of claim 1, wherein the combustion air portions flow parallel through the first supply tract and the second supply tract.

5. A method for regulating a burner, the method comprising:

performing at least one of (i) modulating a burner performance, wherein the combustion air is divided into portions for a at least one of a first supply tract and a second supply tract; and (ii) adjusting a switching state of a heating element as a function of the degree of modulation according to a process for regulating a temperature of combustion air in a mixing zone of a burner, by performing the following:

supplying the combustion air for operating a burner to the mixing zone via a supply path, wherein the combustion air flows through a first supply tract in a first operating mode and in adjustable portions through at least one of the first supply tract and a second supply tract in a second operating mode;

supplying the combustion air with heat in the first supply tract by a heating element, which is switchable on and off; and supplying the combustion air with heat from a combustion zone in the second supply tract.

6. The method of claim 5, wherein the burner is an oil burner.

7. A regulating device for a burner, comprising:

a supply path for supplying combustion air to a mixing zone for operating the burner, the supply path having a heating device for pre-heating the combustion air to be supplied, wherein the supply path includes a first supply tract having a heating element, which is switchable on and off, a second supply tract having a heat exchanger heatable from a combustion zone, situated parallel to the first supply tract; and a final control unit for dividing the combustion air into combustion air portions of the first supply tract and the second supply tract, the temperature of the combustion air in the mixing zone being adjustable to a setpoint temperature by mixing the combustion air portions.

8. The regulating device of claim 7, wherein the final control unit is coupled on the input side to a feeding unit for supplying the combustion air.

9. The regulating device of claim 7, wherein the final control unit has final control elements, which can be operated by an actuator, to at least one of close and open the supply tracts branching off at the outlet side.

10. The regulating device of claim 7, wherein the heating device of the first supply tract is for starting the burner and is switchable so that, during the different operating modes of the burner, the combustion air is supplied in at least one of a heated state and an untreated state.

11. The regulating device of claim 7, wherein at least one temperature detecting unit is provided in the area of the mixing zone for detecting the temperature in the mixing zone.

12. The regulating device of claim 7, wherein at least one further final control unit is provided to regulate the pre-heating of at least one combustion air flow.

13. The regulating device of claim 7, wherein the burner is an oil burner.

14. A burner for generating heat energy with the aid of combustion, comprising:

a regulating device for a burner, including:

a supply path for supplying combustion air to a mixing zone for operating the burner, the supply path having a heating device for pre-heating the combustion air to be supplied, wherein the supply path includes a first supply tract having a heating element, which is switchable on and off, a second supply tract having a heat exchanger heatable from a combustion zone, situated parallel to the first supply tract; and a final control unit for dividing the combustion air into combustion air portions of the first supply tract and the second supply tract, the temperature of the combustion air in the mixing zone being adjustable to a setpoint temperature by mixing the combustion air portions.

15. The burner as recited in claim 14, wherein the burner is an oil burner.

* * * * *